United States Patent
Rong et al.

(10) Patent No.: US 10,910,927 B2
(45) Date of Patent: Feb. 2, 2021

(54) LOCALIZED INDUCTION HEAT TREATMENT OF ELECTRIC MOTOR COMPONENTS

(71) Applicant: Ford Global Technologies, LLC, Dearborn, MI (US)

(72) Inventors: Chuanbing Rong, Canton, MI (US); Feng Liang, Troy, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 15/926,125

(22) Filed: Mar. 20, 2018

(65) Prior Publication Data

US 2019/0296619 A1  Sep. 26, 2019

(51) Int. Cl.
| | |
|---|---|
| H02K 15/02 | (2006.01) |
| H02K 15/03 | (2006.01) |
| C21D 8/12 | (2006.01) |
| B21D 28/22 | (2006.01) |
| C21D 1/04 | (2006.01) |
| H02K 1/16 | (2006.01) |
| H02K 1/27 | (2006.01) |
| C21D 1/42 | (2006.01) |
| H01F 1/153 | (2006.01) |
| H01F 1/147 | (2006.01) |

(52) U.S. Cl.
CPC ............ *H02K 15/024* (2013.01); *B21D 28/22* (2013.01); *C21D 1/04* (2013.01); *C21D 1/42* (2013.01); *C21D 8/1294* (2013.01); *H02K 1/16* (2013.01); *H02K 1/274* (2013.01); *H02K 15/03* (2013.01); *H01F 1/14775* (2013.01); *H01F 1/15333* (2013.01)

(58) Field of Classification Search
CPC . B21D 28/22; C21D 1/04; C21D 1/42; C21D 8/1294; H01F 1/14775; H01F 1/15333; H01F 41/0233; H02K 15/024; H02K 15/03; H02K 1/16
See application file for complete search history.

(56) References Cited

U.S. PATENT DOCUMENTS

| | | | | |
|---|---|---|---|---|
| 4,355,221 | A | * 10/1982 | Lin | C21D 1/42 148/108 |
| 4,726,855 | A | 2/1988 | Tsutsui et al. | |
| 4,772,341 | A | * 9/1988 | Rastogi | C21D 8/1244 148/308 |
| 4,871,403 | A | * 10/1989 | Ludkovsky | C21D 1/30 148/121 |
| 4,917,358 | A | * 4/1990 | Ludkovsky | C21D 1/30 266/104 |
| 4,950,337 | A | 8/1990 | Li et al. | |
| 5,256,211 | A | 10/1993 | Silgailis et al. | |

(Continued)

Primary Examiner — Minh N Trinh
(74) Attorney, Agent, or Firm — David Kelley; Brooks Kushman, P.C.

(57) ABSTRACT

A method of manufacturing a stator is provided. The method may include stamping steel into laminations each having an inner edge area defining a residual stress associated with a magnetic permeability. The method may also include exposing the laminations to a changing magnetic field such that, for each of the laminations, a density of resulting eddy currents is greatest near the inner edge area to heat the same relative to central areas of the lamination to decrease the residual stress and core loss.

6 Claims, 5 Drawing Sheets

(56) References Cited

U.S. PATENT DOCUMENTS

2013/0276297 A1* 10/2013 Kurosaki .............. H02K 15/02
29/596
2019/0181734 A1* 6/2019 Rong ....................... H02K 1/02
2019/0296619 A1* 9/2019 Rong ....................... H02K 1/16

* cited by examiner

LOCALIZED INDUCTION HEAT TREATMENT OF ELECTRIC MOTOR COMPONENTS

TECHNICAL FIELD

The present disclosure relates to a heat-treating process for steel used in electric machines.

BACKGROUND

Electrical steel is a unique steel used to produce specific magnetic properties. Electrical steel is usually manufactured in cold-rolled strips less than 2 mm thick. These strips are cut to shape to form the laminated cores for transformers, and the stator and the rotor of electric motors. The electrical steel is often cut to shape by various methods such as stamping, cutting (e.g., water-jetting or laser cutting), and stamping, a process of placing a flat portion of steel in a die and pressing it with a tool to form the desired surface. Stamping electrical steel may induce residual stress, the internal stress distribution locked into a material. This stress is present even without an external load applied to the material.

Residual stress in electrical components leads to core loss and a decrease in energy efficiency. Core loss is present in certain devices that include a core subjected to a changing magnetic field, such as transformers, inductors, AC motors, and alternators. Ideally, the magnetic field that is transferred through the device may be lost in the core, and dissipated by heat or noise, or both. The residual stress, and in turn, core loss may be reduced by a metal working process called annealing. Annealing is a heat treatment process that alters the physical and sometimes chemical properties of the material being treated. Induction annealing is one type of annealing that involves heating the electrical component by generating eddy currents within the component.

SUMMARY

According to one embodiment of this disclosure a method of manufacturing a stator is provided. The method may include stamping steel into laminations each having an inner edge area defining a residual stress associated with a magnetic permeability. The method may also include exposing the laminations to a changing magnetic field such that, for each of the laminations, a density of resulting eddy currents is greatest near the inner edge area to heat the same relative to central areas of the lamination to decrease the residual stress and core loss.

According to another embodiment of this disclosure, a method of manufacturing a rotor assembly is provided. The method may include stamping steel into laminations each having an outer edge area defining a residual stress associated with a magnetic permeability. The method may also include exposing the laminations to a changing magnetic field such that, for each of the laminations, a density of resulting eddy currents is greatest near the outer edge area to heat the same relative to central areas of the lamination to decrease the residual stress and the magnetic permeability.

According to yet another embodiment of this disclosure, a method of manufacturing an electric machine is provided. The method may include stamping steel into laminations each having inner and outer edge areas. The method may also include causing relative movement between the laminations and a coil generating an alternating magnetic flux, exposing the laminations to the flux such that a density of resulting eddy currents is greatest near the edge areas to heat the edge areas relative to central areas of the lamination to decrease the residual stress and increase the magnetic permeability.

DETAILED DESCRIPTION

Figure 1:
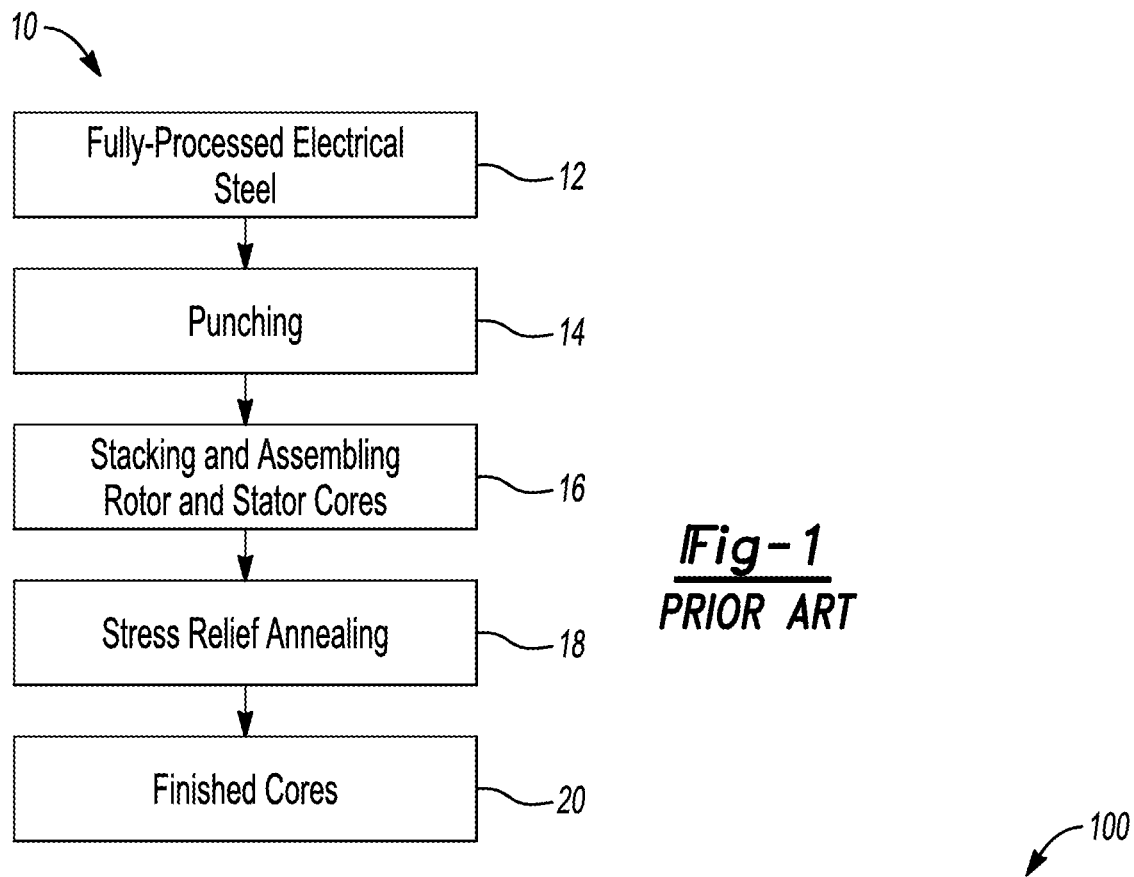
FIG. 1 is a flow chart illustrating a prior art process that includes traditional stress relief annealing for electric steel.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Permanent magnet machines feature magnets mounted on or embedded within a rotor surrounded by a stator. The magnets mounted on or embedded in the rotor couple with the motor's current-induced, internal magnetic fields generated by electrical input to the stator. Similar to other alternating current (AC) induction motors, electrical power is supplied through the stator windings.

Separate groups of stator teeth and the stator windings form multiple magnetic poles that produce a flux flow pattern when the stator coils are energized with a multi-phase sinusoidal voltage. A three-phase electric machine, for example, would have a total of 8 poles and 48 slots. A group of 6 slots would be characteristic of each pole of the particular examples of a 48 slot electric machine herein disclosed. The magnetic flux created by the stator windings interacts with rotor flux created by the permanent magnets in a rotor of a permanent magnet machine, so that a rotor torque is created as the stator windings are excited with a multi-phase voltage.

Permanent magnets of the rotor may be positioned or oriented in different ways to generate desirable magnetic fields. Each of the poles may be formed by a single permanent magnet oriented with one pole (i.e., north or south) in the radially outward direction. The poles of the rotor may be formed by groups of permanent magnets arranged to cooperatively form magnetic poles. One such arrangement orients the magnets in a V-shaped pattern. The internal portion of the "V" has similar magnetic poles that cooperate to form a magnetic pole of the rotor. Each of the permanent magnets may be disposed in pockets or cavities to retain the permanent magnets. These pockets or cavities are typically rectangular and sized to receive the permanent magnets.

The torque created by the stator windings and the rotor flux field develops a uniform torque component and a varying torque component. The total output torque of the electric machine is a combination of both components. Because of the variable torque component, a torque ripple phenomenon is created, which results in motor torque output speed oscillations when the electric machine is acting as a motor. Torque ripple in electric motors is caused by the interaction between the harmonic magnetic fluxes produced by the permanent magnets and the current in the stator winding. Reduction in the harmonic flux produced by the permanent magnet will lead to a reduction in the torque ripple as well as the iron loss.

It has been discovered that local induction heat treatment of certain components may result in a decrease of iron loss. More specifically, the local induction heat treatment results in an increase in magnetic permeability of the area treated and a core loss reduction between 2% and 10%. The reduction in core losses is coupled with the decrease in energy required for heat treatment. In another embodiment, local induction heat treatment may be used to decrease the magnetic permeability in certain areas of the lamination to decrease parasitic magnetic flux. While examples of electric motors are mentioned above, this disclosure aims at reducing iron loss that is caused by residual stress found in or near stamped edges of electrical steel and is not limited to only the components previously described.

Electrical steel is used in electrical applications to construct the electrical devices mentioned above. Electrical steel may include a range of alloys that have favorable magnetic properties for electric machine construction. Iron alloys suitable for electrical steel may include a percentage of silicon up to 6.5%. Electrical steel is typically formed into sheets that may be cut or punched to form laminations. In use, cyclic variation of the applied magnetic field dissipates energy in the electrical steel, a phenomenon referred to as core loss. The efficiency of the electrical component may be increased by reducing the core loss in the electrical steel.

A flowchart 10 of the conventional manufacturing process includes receiving a fully-processed electrical steel 12 and punching the electrical steel sheets to a finished shape by a punch and die 14. Fully-processed steel refers to electrical steel delivered with an insulating coating, full heat treatment, and defined magnetic properties. After punching 14, the laminations may be stacked and assembled as represented at 16. The punching process, that precedes operation 16, involves strong shearing forces at the cutting edge of the shapes and as a result plastic deformation exists in these regions. Plastic deformation or strain results in residual stress that affects the magnetic properties of the core. More specifically, the residual stress, often located near the stamping edge, may lead to an increase in magnetic permeability of the area near the stamping edge. The decrease in magnetic permeability and increase in hysteresis loop may increase core losses that decrease the performance and efficiency of the electrical device. Core losses maybe referred to iron losses and are meant to be interchangeable.

Various techniques may be used to remove the residual stresses induced by the cutting process. For example, stress relief annealing (SRA) 18 may be used. SRA involves heat treating the punched electrical sheet or assembled core at elevated temperatures for an extended period of time. Previous stress relief annealing techniques subjected the stamped electrical sheet or assembly to a temperature of 750° for at least thirty minutes. Under certain circumstances, the time require for annealing could be upwards of 240 minutes. The lengthy time required for annealing increases cost because of the long cycle time. A vacuum or protective gas environment is required during SRA to prevent oxidation of the electrical steel. Other methods of SRA may include induction heating the punched electrical sheet or assembled core. SRA by induction heating may include powering a coil, or magnetic core, or both so that electromagnetic flux penetrates the entire electric sheet or assembled core.

Figure 2:
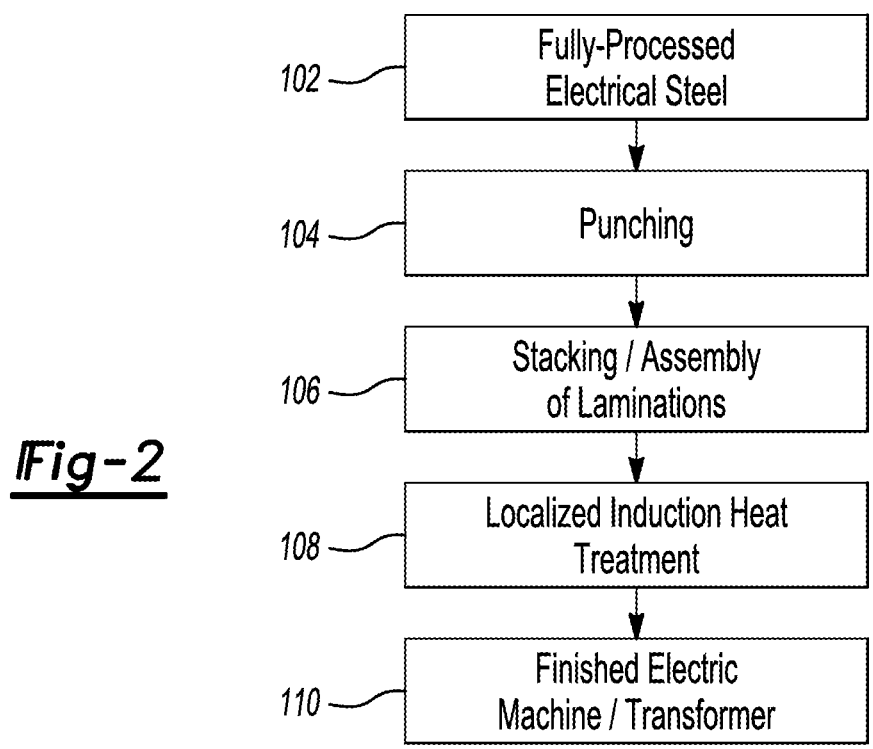
FIG. 2 is a flow chart illustrating a process that includes a localized induction heat treatment process for electrical steel.

Referring to FIG. 2, a flowchart 100 illustrating a process that includes locally heat treating a lamination by induction heating is illustrated. Note that the flowchart in FIG. 2 is for illustrative purposes only and that the method should not be construed as limited to the flowchart in FIG. 2. Some of the steps of the method 100 may be rearranged while others may be omitted entirely.

Fully-processed electrical steel is received, as represented at 102, and punched into the desired shape and size, as represented at 104. As mentioned above, fully-processed steel refers to electrical steel delivered with an insulating coating, full heat treatment, and defined magnetic properties. After punching at 104, the laminations are stacked and assembled as represented at 106. The assembly may be for a rotor, a stator, or a transformer or any suitable components that make up an electric machine when assembled. The assembly or stack of laminations may then undergo local heat treatment process by induction heating as represented at 108. The stack of laminations may be assembled to other assemblies to form an electric machine or transformer, as represented at 110.

Figure 3:
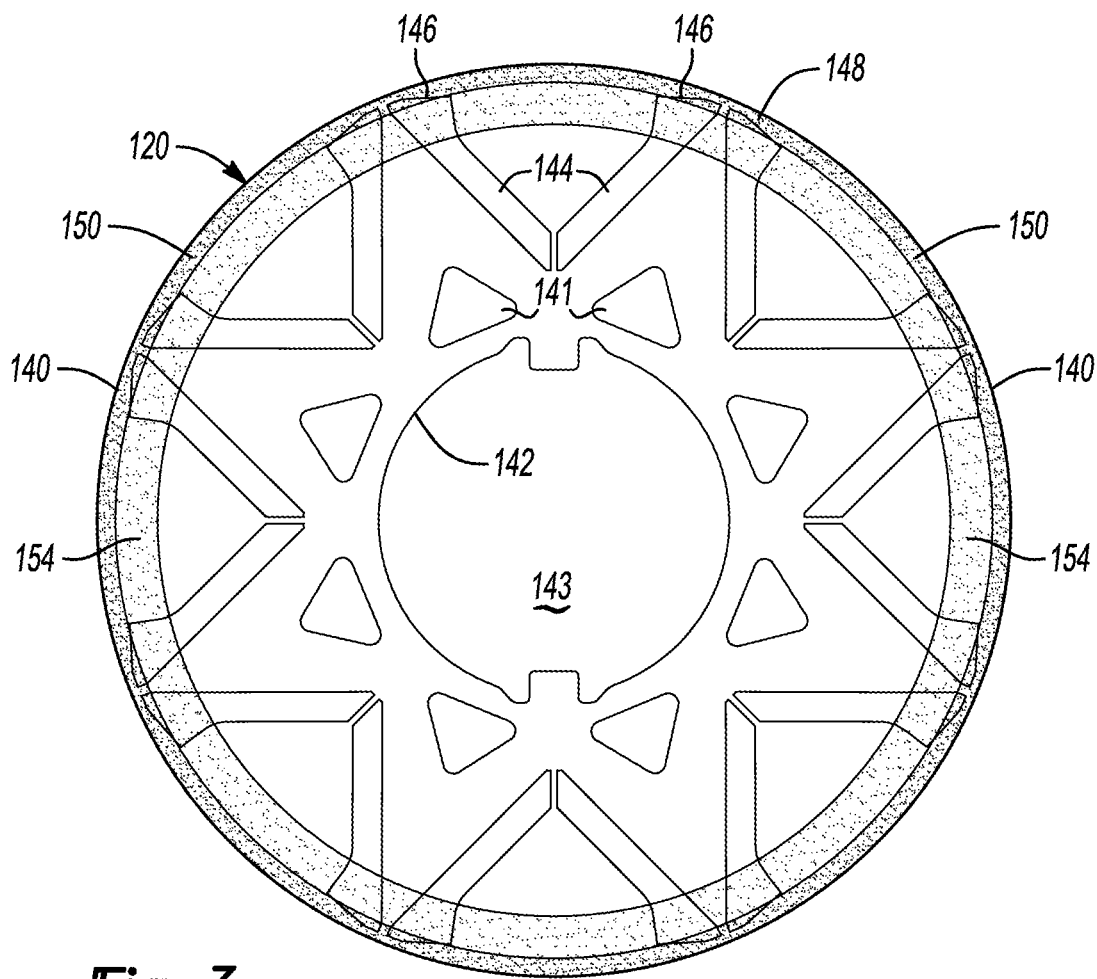
FIG. 3 is a top-view of an example rotor lamination illustrating exemplary localized induction heat treated zones.

Referring to FIG. 3, a top view of a lamination, such as a rotor lamination 120 is illustrated. As previously mentioned, the rotor lamination 120 is one of many that may be stacked to form a rotor core or stack of laminations 128. The rotor lamination 120 includes an outer edge 140, that makes up the outermost portion of the lamination 120, and an inner edge 142 that is defined by a central opening 143. The lamination 120 may include a plurality of weight reduction apertures 141 that are radially arranged about the central opening 143. The lamination 120 may define a plurality of magnet openings 144. The magnet openings 144 may be arranged in a set of pairs that are symmetrically opposite (e.g., mirrored) to one another. More specifically, the magnet openings 144 may be arranged to form a V-shape. Generally, the outer edge 120 is formed by a cutting or blanking operation and the central opening. The inner edge 142 weight reduction apertures and magnet openings 144 may be formed by a piercing operation. The magnet openings 144 include an outer edge 146 that is positioned nearest to the outer edge 140 of the lamination 120. The area between the outer edge 146 of the magnet openings 144 and the outer edge 140 of the lamination 120 may be referred to as a bridge area 148 of the lamination.

The stamping operation that forms the outer edge 140 of the lamination results in plastic deformation and residual stress within the outer edge area 150 of the lamination 120.

The residual stress within the outer edge area 150 decreases the magnetic permeability increases core loss of the outer edge area 150 and in particular the bridge area of the lamination 120. The residual stress of the outer edge area 150 may be decreased by heat treating the lamination. Therefore the magnetic permeability may increase and the core loss may be reduced in the outer edge. Because the residual stress is more prevalent in the outer edge area 150, locally heat treating the outer edge area 150 may be more efficient than heat treating the entire lamination 120. Locally heat treating the lamination 120 may require less time (reducing cycle time) and less power.

As will be described in greater detail below, the lamination 120 may be locally heat treated by induction heating. Induction heating involves applying an alternating current through a coiled wire, either by itself or coiled around a magnetic core, that is positioned near the lamination 120 or stack of laminations 128. The alternating current generates an alternating magnetic field that induces eddy currents within the lamination 120 to heat the lamination and reduce the residual stress present therein. As the frequency of the alternating current is increased, eddy currents are concentrated within the edge areas (e.g., outer edge area 150) relative to the central areas of the laminations. The concentration of the eddy current within the edge areas may be known as a "skin effect." The skin effect is the tendency of an alternating electric current to become distributed within a conductor such that the current density is largest near the surface of the conductor, and decreases with greater depths in the conductor. The shaded outer edge area 150 indicates the area of the lamination 120 where current density is the greatest. The current density has a depth δ measured between the outer edge 140 and the inner edge of the outer edge area 150. A second shaded area 154 is a concentric ring disposed inside of the outer edge area 150 and represents a current density that is less than the current density of the outer edge area 150.

While a rotor lamination is shown in FIG. 3, the description of the heat treatment and skin effect principle mentioned above equally apply to stator laminations, toroids, and other components for electric machines.

Figure 4:
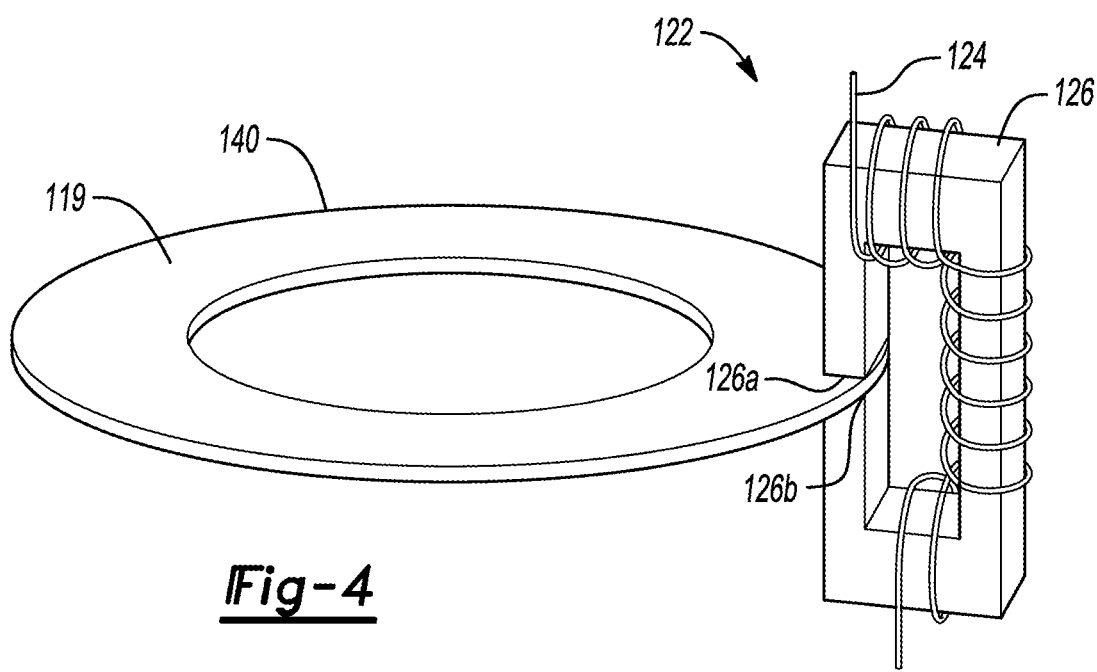
FIG. 4 is a perspective view of an exemplary toroid or ring undergoing a localized induction heat treatment process according to one embodiment of this disclosure.
Figure 5:
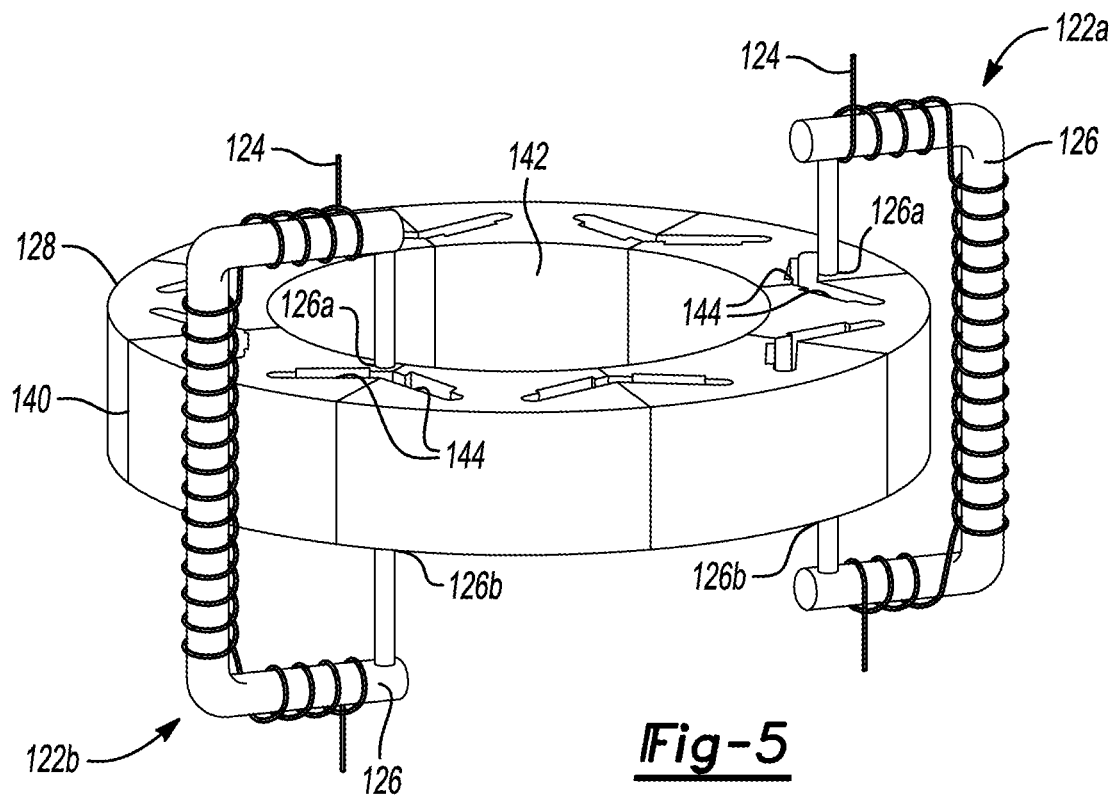
FIG. 5 is a perspective view of a rotor assembly undergoing a localized induction heat treatment process according to another embodiment of this disclosure.
Figure 6:
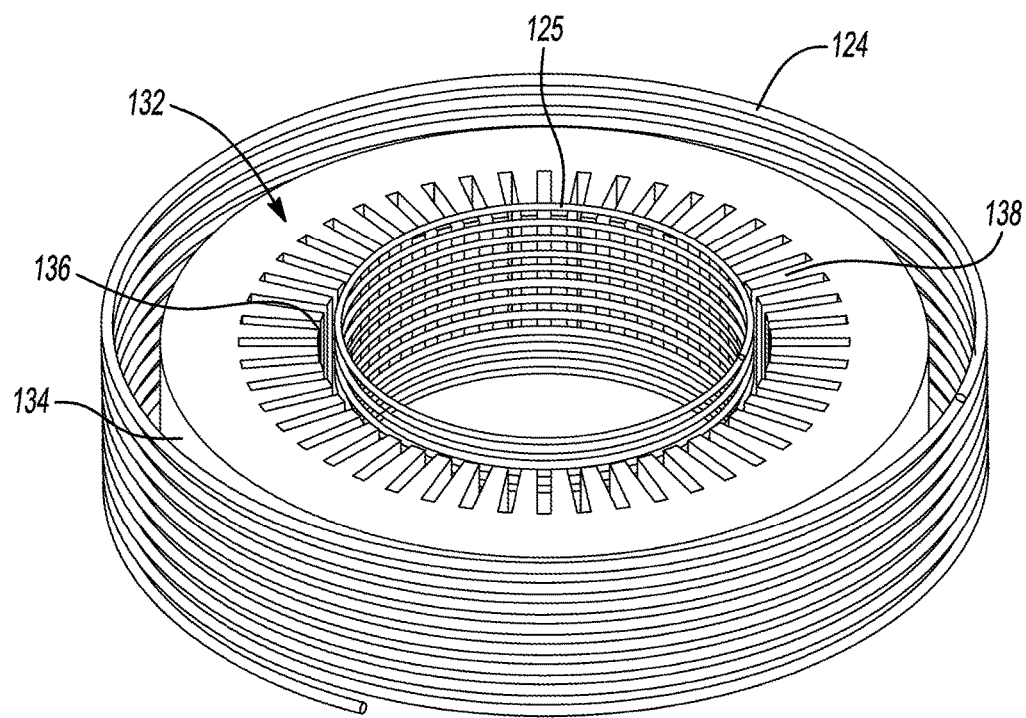
FIG. 6 is a perspective view of an example a stator assembly undergoing a localized induction heat treatment process according to another embodiment of this disclosure.

Referring to FIG. 4-FIG. 6, various illustrations of locally heat treating electrical components by induction heating are provided. Referring specifically to FIG. 4, The process may include a C-shaped induction heater 122 that includes magnetic core 126 and a wire 124 that surrounds the core 126. The magnetic core 126 includes a pair of opposing ends 126a and 126b that are positioned on each side of a toroid or ring 119. More specifically, the ends 126a and 126b are disposed above and below an outer edge area of the toroid or ring 119. A high-frequency alternating current is provided through the wire 124 so that an alternating magnetic field penetrates the portion of the of the toroid or ring 119 that is positioned between the opposing ends 126a and 126b. The penetrating alternating magnetic field may generate eddy currents that flow through the resistance of the toroid or ring so that the portion positioned between the pair of ends is heated.

Figure 5A:
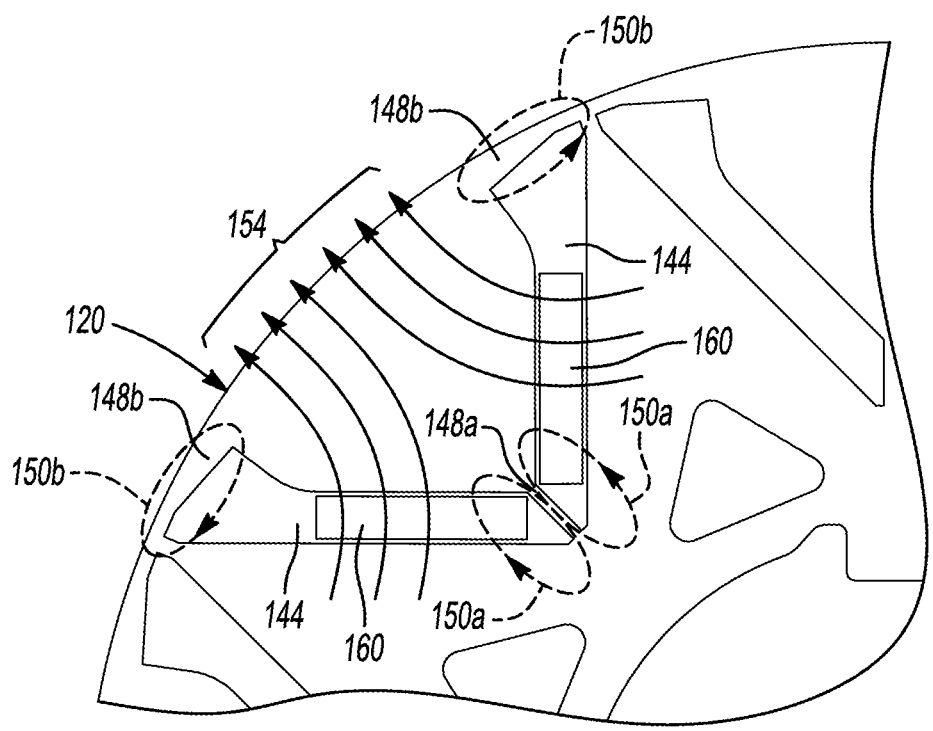
FIG. 5A is a partial-top view of a lamination and magnetic flux and parasitic magnetic flux shown therein.

Referring to FIGS. 5 and 5A, localized induction heat treatment of a rotor core or stack of laminations 128 using two C-shaped induction heaters 122a and 122b. In this embodiment, the localized induction heat treatment is used to decrease the magnetic permeability of bridge areas 148 of the rotor laminations 128. Decreasing the magnetic permeability of the bridge areas 148 may decrease parasitic magnetic flux 150 of the bridge areas 148. Parasitic magnetic flux may lead to an increase in iron loss and a decrease in efficiency of the electric machine. Referring specifically to FIG. 5A, a partial detail view of a lamination 120 or stack of laminations 128 is shown. The lamination defines a pair of magnet cavities 144 that each contain a magnet 160. A first bridge area, such as the central bridge area 148a is positioned between the pair of magnet cavities 144. Second bridge areas, such as the outer bridge areas 148b are positioned between the edge of the lamination 120 and the outer portion of the magnet cavities 144. Magnetic flux 154 is represented by the curved arrows and indicate a flow of magnetic flux from each of magnets 160 towards a stator (not illustrated). Parasitic magnetic flux or leakage refers to a portion of a magnetic field that travels through the bridge areas as opposed to through the outer edge to the stator. Parasitic magnetic flux 150a is represented by the circular dashed lines positioned near the central bridge area 148a. A second set of parasitic flux 150b is represented by circular dashed lines 150b positioned near the outer bridge areas 148b.

Parasitic magnetic flux may be decreased by decreasing the cross-sectional area or thickness of the bridge areas 148. However, if the thickness is decreased too much, forces acting on the lamination during operation may result in fractures or a break in the lamination. Parasitic flux within the bridge areas 148 may be decreased by decreasing the magnetic permeability of the bridge areas 148. The magnetic permeability of the bridge areas (or other areas of the lamination) may be decreased by local induction heating the bridge areas 148.

Referring back to FIG. 5, local induction heating of the bridge area is shown. The first induction heater 122a is positioned above and below a central bridge area 150a of the laminations 128. Each of the induction heaters 122a and 122b may rotate around the stack of laminations 128 to heat treat portions of the laminations 128. In another embodiment, the induction heaters 122a and 122b may be held stationary and the laminations 128 may rotate.

Referring to FIG. 6, localized induction heat treatment of a stator assembly 132 comprised of a plurality of the stator laminations 134 is provided. Each of the stator laminations 134 include a plurality of stator teeth 138 that are circumferentially arranged about the inner edge 136 of the stator lamination 134. In this embodiment, an inner coiled wire 125 is disposed within the inner edge of the 136 of the stator assembly 132 and an outer coil 124 is disposed around the outer edge 134 of the stator assembly 132. An alternating current may be provided to the outer coil 124 and the inner coil 125 to generate an alternating magnetic field that is penetrates the inner edge areas and the outer edge areas of the stator assembly 132.

Figure 7:
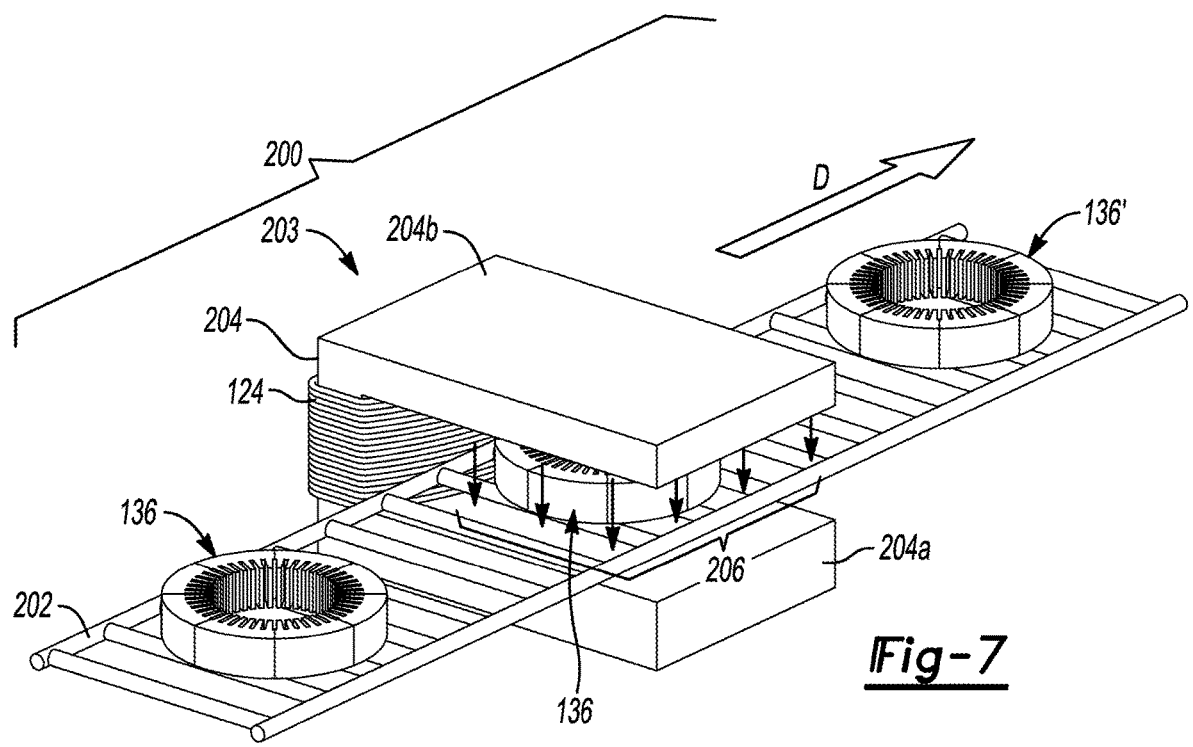
FIG. 7 is a perspective view of an example a stator assembly undergoing a localized induction heat treatment process according to another embodiment of this disclosure.

Referring to FIG. 7, a perspective view of a process 200 for induction heating portions of an electric machine component, such as the stator assembly 136 according to one embodiment of this disclosure is illustrated. The process may include a conveyor belt 202 or other suitable arrangement that feeds the stator assembly 136, in the direction indicated by the directional arrow D so that it passes through an induction heater 203. The induction heater 203 may include a C-shaped magnetic core 204 that is comprised of a lower end 204a and an upper face 204b. A coil or coiled wire 124 may be wrapped around a portion of the magnetic core 204 and supplied with an alternating current. As the stator assembly 136 passes between the lower end 204a and the upper end 204b of the C-shaped magnetic core, an alternating magnetic field or flux 206 passes through the stator assembly 136 so that it is locally heat treated by induction heating as described above. The conveyor belt 202 may be paused so that the stator assembly 136 is positioned between the lower end 204a and the upper end 204b of the C-shaped magnetic core for a sufficient time (e.g., one to two minutes) to locally heat treat the edge areas.

The time required to sufficiently heat treat the edge areas of the electric machine component or stator assembly 136 may vary depending on the cross-sectional area, the thickness of the individual laminations, and the thickness of the stack of laminations. In another embodiment, the conveyor belt may move at a predetermined speed so that the stator assembly 136 is positioned is between the lower end 204a and the upper end 204b of the C-shaped magnetic core for a sufficient time. After the electric machine component or stator assembly 136 is sufficiently heat treated, a treated electric machine component or stator assembly 136' emerges. The component or stator assembly may then be assembled with other components to produce the electric machine.

Figure 8:
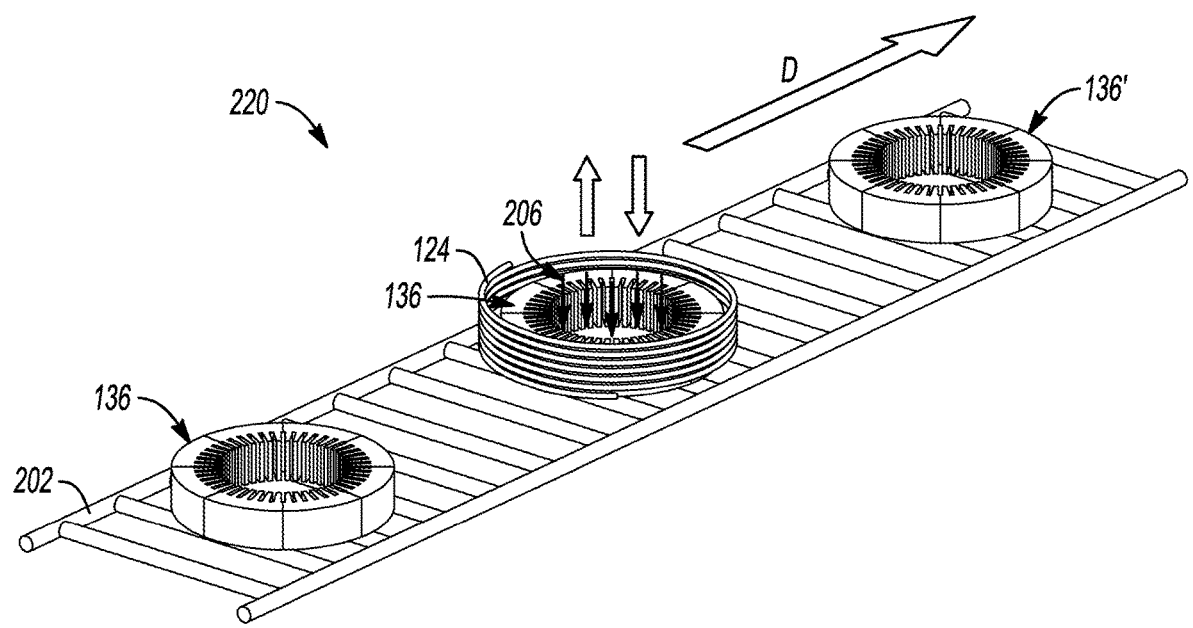
FIG. 8 is a perspective view of an example a stator assembly undergoing a localized induction heat treatment process according to another embodiment of this disclosure.

Referring to FIG. 8, a perspective view of a process for induction heating portions of an electric machine component, such as the stator assembly 136 according to another embodiment of this disclosure is illustrated. In this embodiment, a coil 124 that is sized to surround the stator assembly 136 is positioned above the conveyor belt 202 and lowered when the stator assembly 136 is positioned below the coil 124. The coil 124 is powered by an external power source (not illustrated) to generate an alternating magnetic field or flux 206 passes through the stator assembly 136. The coil 124 may surround the stator assembly 136 for a sufficient time to locally heat treat the edge portions of the stator assembly 136.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of manufacturing a stator comprising:
    stamping steel into laminations each having an inner edge area, defining a residual stress associated with a magnetic permeability, and an outer edge area defining a second residual stress with a second magnetic permeability; and
    exposing the laminations to a changing magnetic field such that, for each of the laminations, a density of resulting eddy currents is greatest near the inner edge area and outer edge area to heat the inner edge area and the outer edge area relative to central areas of the lamination to decrease the residual stress, the first magnetic permeability, the second magnetic permeability, and core loss.

2. The method of claim 1, wherein the changing electromagnetic field is generated via application of an alternating current through a coil positioned adjacent to the laminations.

3. The method of claim 2, wherein the exposing the laminations to the changing magnetic field results in an increase in the magnetic permeability of the inner edge area.

4. The method of claim 3, wherein a frequency of the changing magnetic field is selected based on a cross-sectional area of the set of laminations.

5. The method of claim 1, wherein a duration of the exposing is selected based on a thickness of set of laminations.

6. The method of claim 1, wherein exposing the laminations includes positioning a metal member adjacent to a surface of the laminations and applying an alternating current, at a predetermined frequency for a predetermined period, to a wire coiled around a portion of the metal member to generate eddy currents within and heat the laminations to reduce residual stress of the inner edge area.

\* \* \* \* \*